United States Patent [19]

Masters

[11] Patent Number: 5,034,167
[45] Date of Patent: Jul. 23, 1991

[54] APPARATUS AND METHOD FOR ELIMINATING STATIC CHARGE FROM POLYSTYRENE BEADS FOR PATTERN MOLDING

[75] Inventor: Robert C. Masters, Dearborn, Mich.

[73] Assignee: General Motors Corporation, Detroit, Mich.

[21] Appl. No.: 583,531

[22] Filed: Sep. 17, 1990

[51] Int. Cl.⁵ .................... B29B 13/08; B29C 35/00
[52] U.S. Cl. ................................. 264/22; 264/45.5; 264/50; 264/51; 264/126; 425/174.4; 425/174.8 E; 361/213
[58] Field of Search ............... 264/22, 126, 50, 51, 264/45.5; 425/174.4, 174.8 E; 361/213

[56] References Cited

U.S. PATENT DOCUMENTS

| | | | |
|---|---|---|---|
| 2,547,132 | 4/1951 | Longfellow. | |
| 3,641,605 | 2/1972 | Lindsay | 15/1.51 |
| 4,185,783 | 1/1980 | Lacchia | 239/704 |
| 4,438,479 | 3/1984 | Schwartz et al. | 361/213 |
| 4,514,779 | 4/1985 | Wilkinson | 361/213 |

OTHER PUBLICATIONS

The brochure, "Nuclecel(R), Air Gun and Ionized Air Blower", Herbert Products, Inc., Westbury, NY., one page.
Brochure, Form No. 3699-A, "Nuclestat(R) Nuclear Static Neutralization", Herbert Products, Inc., Westbury, NY, one page.
Brochure, Form No. 3698, "Methods of Static Control", Herbert Products, Inc., Westbury, NY, one page.

Primary Examiner—Robert A. Dawson
Assistant Examiner—Abeer I. Daoud
Attorney, Agent, or Firm—George A. Grove

[57] ABSTRACT

A process for eliminating the static charge from expandable polystyrene beads during a molding cycle. Pre-expanded polystyrene beads are injected into a mold cavity by using an air stream created by a venturi-type fill gun. To prevent the beads from carrying static while being injected into the mold, the air is ionized by exposure to high energy nuclear particles prior to contact with the polystyrene beads.

2 Claims, 2 Drawing Sheets

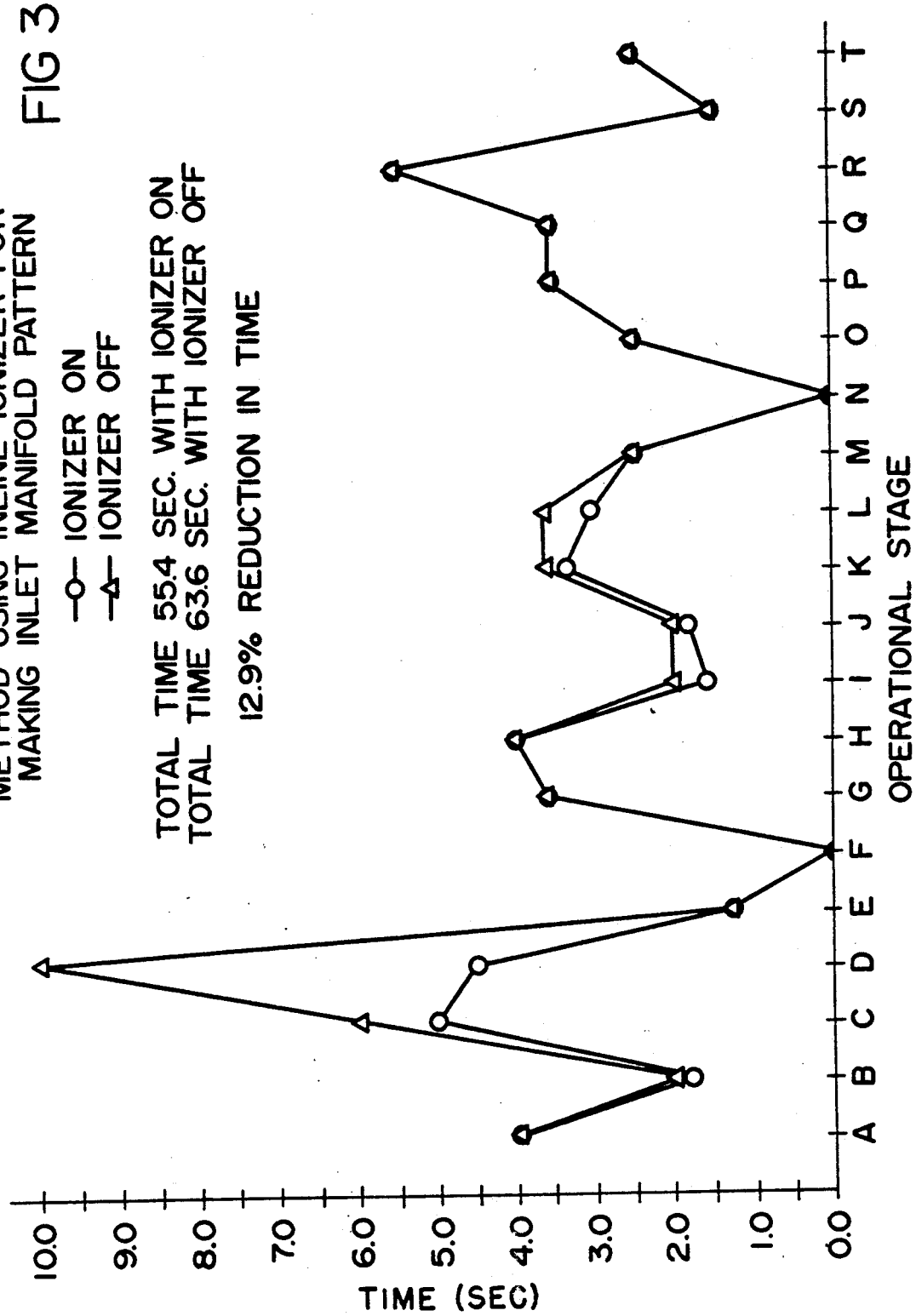

APPARATUS AND METHOD FOR ELIMINATING STATIC CHARGE FROM POLYSTYRENE BEADS FOR PATTERN MOLDING

TECHNICAL FIELD

This invention relates to an apparatus and method for counteracting static charge from low-density polystyrene beads and, more particularly, an apparatus and method for eliminating static charge from pre-expanded polystyrene beads while making polystyrene foam articles.

BACKGROUND OF THE INVENTION

In a typical lost foam casting process, an expendable pattern formed of expanded polystyrene is embedded in an unbonded sand mold. Molten metal poured into the mold decomposes and replaces the pattern to form, upon cooling, a product casting. Decomposition of the pattern during casting generates vapors that vent into the surrounding sand mold. It is desired to make the pattern of very low density polymer foam to minimize the mass to be decomposed and the volume of the resulting vapors.

Polystyrene is commercially available in the form of a dense bead containing a blowing agent. To make the pattern, the dense bead is first pre-expanded by heating to activate the blowing agent, whereupon the bead expands to nearly final density. The pre-expanded beads are entrained in an air stream and injected and packed into a mold. Within the mold, the packed beads are subjected to steam and fused into a section that may be suitably assembled with other sections to complete a pattern.

However, problems during the injection of the polystyrene beads into the mold may cause inadequate filling of the mold cavity and produce unacceptable patterns. Clumps of the beads that form may clog the fill tube and fill gun leading to the mold cavity. Also, instead of uniformly packing to fill the mold, there is a tendency for the beads to pack in a manner that leaves voids amongst the beads, which in turn produces voids in the pattern. I have now discovered that these problems are related to the accumulation of static electrical charge on the beads during pre-expansion and storage. Also during filling of the mold cavity, the static charge produces attractive and repulsive forces between the beads which are enhanced because of the low density of the beads.

It is an object of the present invention to provide an apparatus and method for neutralizing static electrical charge carried by low-density pre-expanded polystyrene beads during entrainment in an air stream for injection into a mold and steam fusion into an integral structure such as a lost foam pattern, which method comprises treating the air stream prior to contact with the beads to generate ions therein effective to counteract the static charge and thereby promote complete and uniform filling of the mold to produce a void-free structure.

Yet another object of the present invention is to provide an apparatus and method for making polystyrene patterns which: (1) require less time to make the polystyrene pattern, (2) have uniform fusion times and pressures and (3) allow the use of lower pressures.

SUMMARY OF THE INVENTION

In accordance with the invention, these and other objects and advantages are addressed as follows. An apparatus for manufacturing a polystyrene foam article is provided which includes a means for entraining pre-expanded polystyrene beads in an air stream, a means for introducing the air stream with the entrained beads into a mold cavity while venting air therefrom, a means for steaming the beads in the cavity under conditions that fuse the beads into a product article, and a means for exposing the air in the air stream to high energy particles prior to entraining the beads therein in order to ionize the air in the air stream to counteract static electrical charge carried by the beads. By counteracting the static electrical charge, this improves filling of the cavities with the beads.

In addition, a method of manufacturing a polystyrene foam article from pre-expanded polystyrene beads is provided which includes (a) exposing air to high energy particles prior to entraining the beads therein to ionize the air to counteract static electrical charge carried by the beads, (b) entraining the beads in the ionized air stream, (c) introducing the air stream with the entrained beads into mold cavities while venting air therefrom, whereupon the cavities become filled by the beads, and (d) subjecting the beads within the cavities to pressurize steam under conditions that fuse the beads into a product article.

BRIEF DESCRIPTION OF THE DRAWINGS

The nature and extent of the present invention will be clear from the following detailed description of the particular embodiments thereof, taken in conjunction with the appendant drawings, in which:

FIG. 3 graphically shows the time periods required for various stages of making a polystyrene pattern both: (1) using an ionizer according to the invention and (2) without an ionizer.

DETAILED DESCRIPTION OF THE INVENTION

Figure 1:
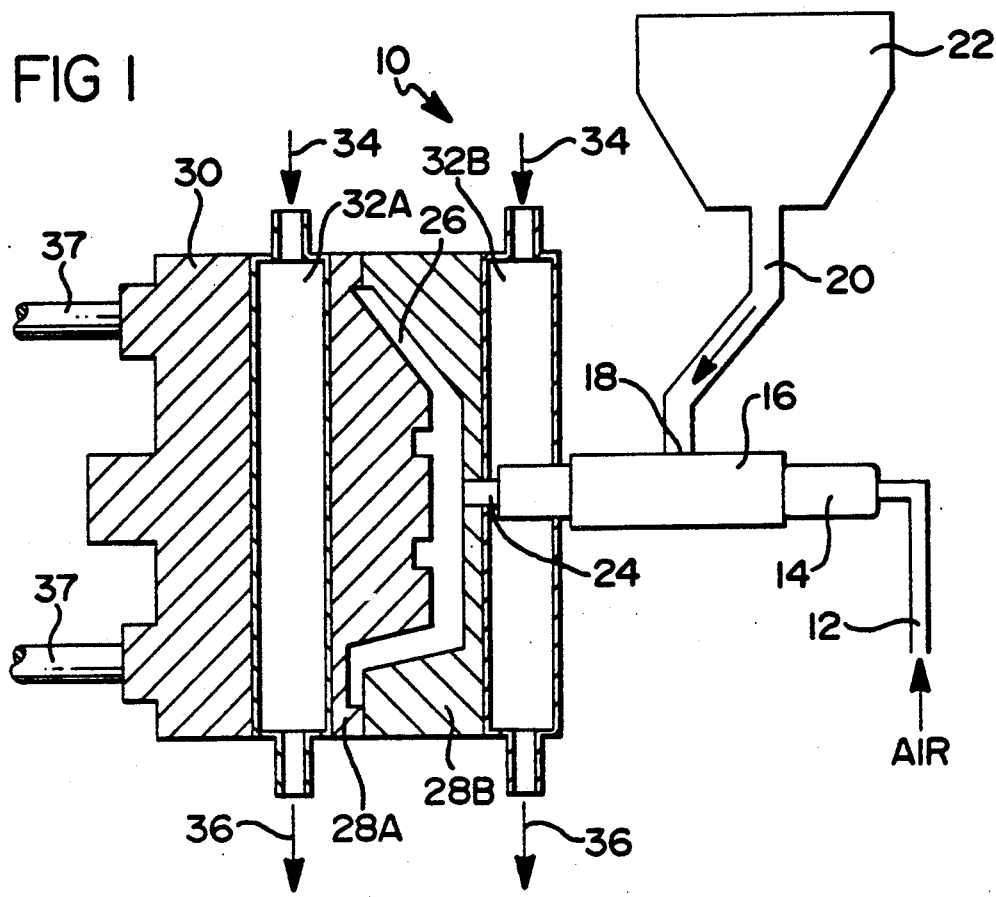
FIG. 1 shows an elevational side view in partial cross-section of an apparatus of the invention for making polystyrene patterns.

Referring first to FIG. 1, an apparatus for making polystyrene patterns according to the invention is generally denoted by the numeral 10. In operation, compressed air flows through air inlet tube 12, through ionization device 14, and through fill gun 16 which has a venturi orifice (not shown) at its exiting end. In communication with the fill gun interior at entrance point 18 is bead inlet line 20 which is also in communication with bead hopper 22. Bead hopper 22 is filled with polystyrene beads which have been pre-expanded with heat to almost final density. When air passes through fill gun 16, the air flow creates a vacuum at entrance point 18 which pulls the pre-expanded beads from bead inlet line 20. Due to the presence and operation of ionization device 14, air which flows through fill gun 16 and comes in contact with the polystyrene beads is ionized. When the air-polystyrene bead mixture exits fill gun 16, it passes through fill tip 24 and enters mold cavity 26 defined by mold pieces 28A and 28B. Mold pieces 28A and 28B may be formed of metal, especially soft metal, such as aluminum. Mold pieces 28A and 28B are attached to steam chest 32A and 32B, respectively. Mold piece 28A is attached to movable machine frame 30 which is slidable, along tie bars 37.

Once mold cavity 26 is thoroughly filled with pre-expanded polystyrene beads, the polystyrene bead-filled cavity is subjected to steam heat. Steam enters steam chests 32A and 32B via steam lines 34, and steam and condensate drains from the steam chests via condensate lines 36. The pre-expanded polystyrene beads, upon being subjected to heat, fuse together and thereby form a uniformly dense polystyrene pattern.

Not necessarily shown in the Figure but advantageous to include with the apparatus are (1) means to close the fill gun exit and blow back excess beads in fill gun 16 and bead inlet line 20 to bead hopper 22, (2) means for pulling vacuum on mold cavity 26, (3) means for cooling mold pieces 28A and 28B, mold cavity 26 and contents, and (4) means for opening and closing mold pieces 28A and 28B.

Without ionization device 14, the polystyrene beads tend to gather a large amount of static electricity which leads to inadequate filling of mold cavity 26 due to the polystyrene beads either being attracted or repelled to each other or the mold material. The inadequate filling leads to poor quality, non-uniform patterns. With ionization device 14 operating, the static build-up on the polystyrene beads is avoided or substantially reduced so that the polystyrene beads fill every detail of mold cavity 26 with uniform density, resulting in a uniformly dense polystyrene pattern and producing close to a 100 percent yield of quality product. In addition, because of the absence or reduction of the static electricity on the beads, the time needed to fill mold cavity 26 is significantly reduced and lower air pressures can be used. The presence of ionization device 14 also results in predictable, uniform fusion times since mold cavity 26 can be reproducibly filled.

Ionization device 14 comprises a nuclear neutralizer which utilizes radioisotope emission to ionize the air. The ionization process involves the emission of alpha particles which, when they contact oxygen molecules, split off some of the molecules' electrons resulting in electrons and positively-charged oxygen ions. Millions of alpha particles may be emitted per second and each particle produces thousands of ions.

A nuclear-powered ionization device 14 suitable for use in this invention is available from Herbert Products, Inc., sold under the trademarks "NUCLECEL" and "NUCLESTAT" and contains polonium isotope 210. For most effectiveness, it is most desirable to have the ionization device as close to the entrance of the polystyrene beads as possible.

Figure 2:
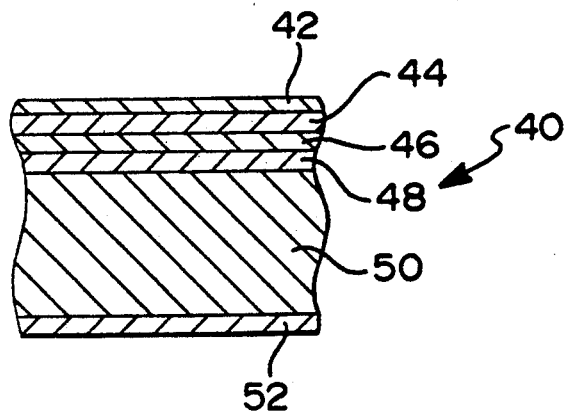
FIG. 2 shows a cross-sectional view of an active element of a nuclear static control device.

Referring to FIG. 2, nuclear foil 40, an active device which may be used in ionization device 14, is approximately 0.007 inch thick and includes a top layer 42 of gold about 0.00002 inch thick, a second gold layer 44 about 0.00004 inch thick, a third layer 46 of polonium 210 and gold about 0.00002 inch thick, a fourth layer 48 of gold about 0.0003 inch thick, a fifth layer 50 of silver about 0.007 inch thick, and a final layer 52 of gold about 0.00002 inch thick. The gold and silver layers are pressure welded together around the polonium 210 layer. When ionization device 14 is in place in an air stream, alpha particles are emitted from nuclear !oil 40 which create both electrons and positively-charged oxygen ions in the air stream. These electrons and positively-charged ions carried by the air stream serve to substantially neutralize any static electrical charge on the polystyrene beads which the air contacts. It is preferred to employ an air filter assembly upstream from the apparatus to eliminate water and oil possibly entrained in the incoming air which may contaminate the nuclear foil.

Looking now to FIG. 3, using the ionization device not only was found to make more uniformly-dense polystyrene foam articles, but, unexpectedly, its use reduced the cycle time for making the polystyrene foam articles. The reduction in cycle time may be attributed to a reduction in static charge on the polystyrene beads. FIG. 3 illustrates the reduction in time by using an ionizer vs. not using an ionizer when making an inlet manifold polystyrene pattern. The method corresponds to using the apparatus of FIG. 1. The various operational steps for making the polystyrene pattern, given along the X-axis, are: Step A — mold pieces 28A and 28B are closed together; Steps B, C, and D — polystyrene beads fill mold cavity 26; Step E — remaining polystyrene beads in bead inlet line 20 and fill gun 16 are blown back into bead hopper 22; Step F — vacuum is pulled on mold cavity 26; Steps G and H — mold pieces 28A and 28B, mold cavity 26 and the contained polystyrene beads are pre-heated with steam; Steps I, J, K, and L — the polystyrene beads are allowed to fuse together to form a pattern; Step M — mold pieces 28A and 28B and the polystyrene pattern are pre-cooled; Step N — vacuum on mold cavity 26 is released; Steps O, P, Q, and R — the polystyrene pattern is cooled by passing water through steam chests 32A and 32B; and, finally, Steps S and T — mold pieces 28A and 28B are separated to release the polystyrene pattern. The steps which exhibit the most significant reduction in time are Steps C, D, I, and L as shown in FIG. 3. The total time for making the inlet manifold pattern was found to be 63.6 seconds with the ionizer off and 55.4 seconds with the ionizer on, indicating a 12.9 percent reduction in cycle time when using the ionizer. The most significant reductions in cycle time are experienced while making larger, detailed or convoluted articles.

In addition, operating the ionizer while making polystyrene patterns produced high quality patterns, resulted in more uniform fusion times and pressures among several cycles, and allowed the use of lower pressures during operation.

Thus, there is provided in accordance with the present invention, an improved apparatus and method for making molded polystyrene foam articles, especially polystyrene patterns. The method and apparatus of this invention provides a way to reduce the static on polystyrene beads entering a mold cavity, so that the beads adequately fill the mold cavity resulting in a high yield of quality, uniformly dense molded polystyrene articles. The invention results in less processing time required, enables the use of lower pressures, has more uniform fusion times, and uses more uniform pressures from cycle to cycle.

While my invention has been described in terms of specific embodiments, it will be appreciated that other embodiments could readily be adapted by one skilled in the art. Accordingly, the scope of my invention is to be limited only by the following claims.

The embodiments of the invention in which an exclusive property or privilege is claimed are defined as follows:

1. In a method of manufacturing a polystyrene foam article comprising entraining pre-expanded polystyrene beads in an air stream, introducing the air stream with the entrained beads into a mold cavity while venting air therefrom, whereupon the cavity becomes filled with the beads, and subjecting the beads within the cavity to steam under conditions that fuse the beads into a product article, the improvement comprising:

exposing the air to alpha particles prior to entraining the beads therein to ionize the air to counteract static electrical charge carried by the beads and thereby improve filling of the cavity with the beads.

2. In an apparatus for manufacturing a polystyrene foam article comprising means for entraining pre-expanded polystyrene beads in an air stream, means to introduce the air stream with the entrained beads into a mold cavity while venting air therefrom, whereby the cavity becomes filled with the beads, and means for steaming the beads in the cavity under conditions that fuse the beads into a product article, the improvement comprising means for exposing the air to alpha particles prior to entraining the beads therein to ionize the air to counteract static electrical charge carried by the beads, thereby improving filling of the cavity with the beads.

* * * * *